May 13, 1924.
C. H. MILLER
SIGNAL
Filed Feb. 14, 1923
1,494,270
2 Sheets-Sheet 1
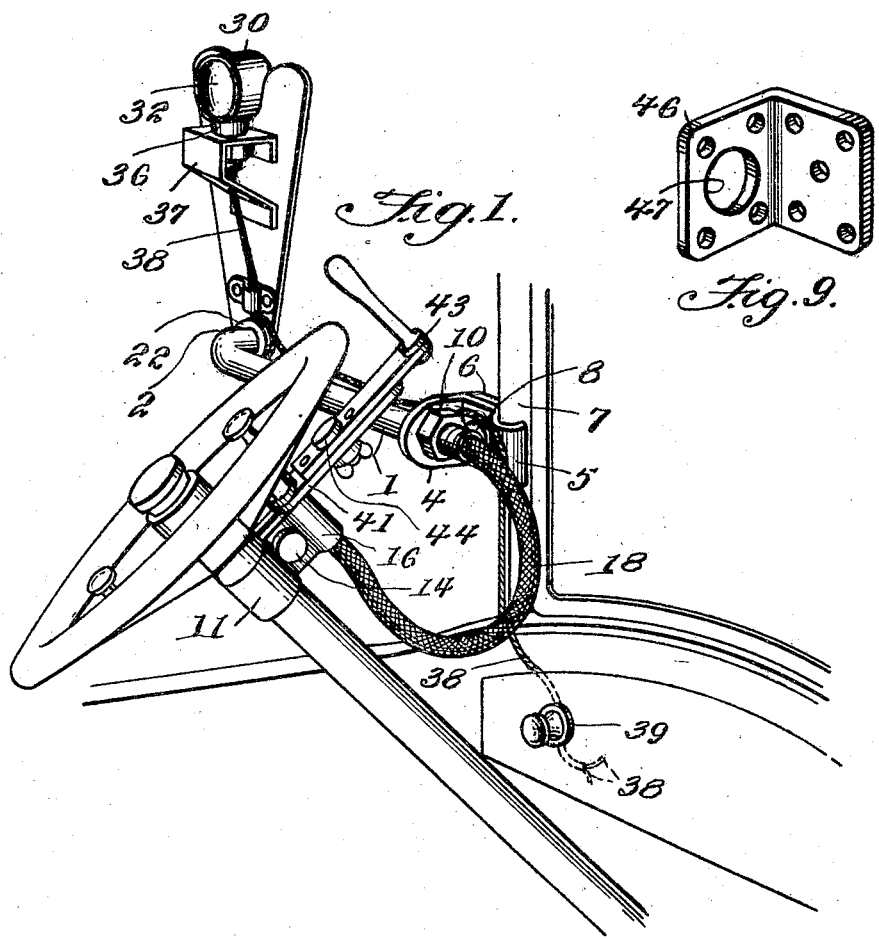
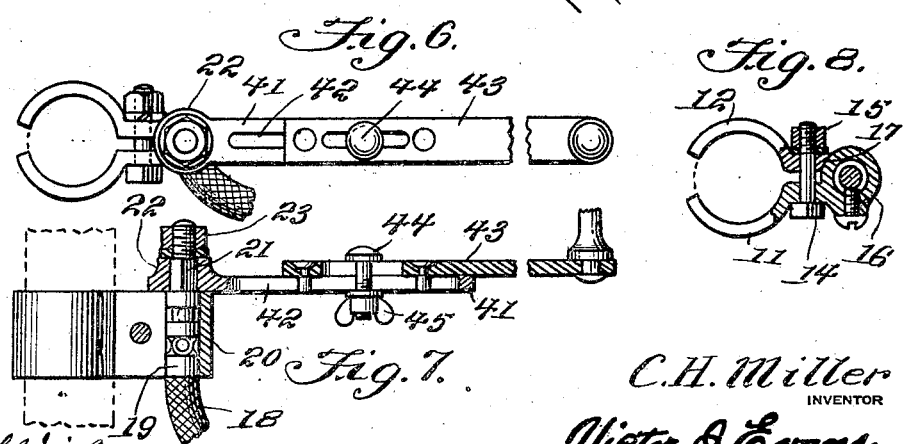
C. H. Miller
INVENTOR
BY Victor J. Evans
ATTORNEY
WITNESS:

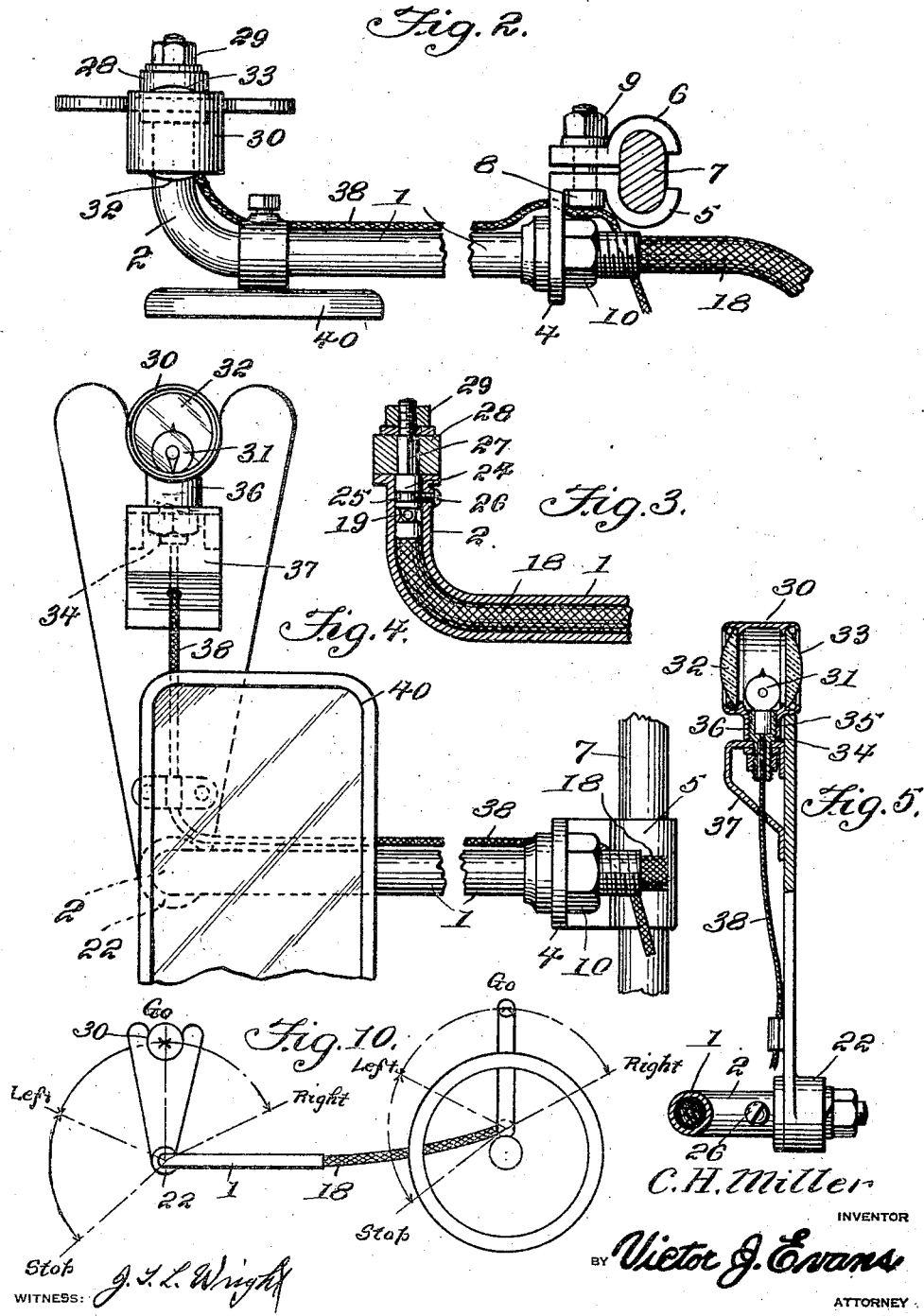

Patented May 13, 1924.

1,494,270

UNITED STATES PATENT OFFICE.

CHARLIE H. MILLER, OF SLIDELL, LOUISIANA.

SIGNAL.

Application filed February 14, 1923. Serial No. 618,955.

*To all whom it may concern:*

Be it known that I, CHARLIE H. MILLER, a citizen of the United States, residing at Slidell, in the parish of Saint Tammany and State of Louisiana, have invented new and useful Improvements in Signals, of which the following is a specification.

This invention relates to a signaling device for use on an automobile to give warning when the driver of the car intends to slow up, turn a corner or otherwise change the direction or motion of the vehicle.

The principal object of the invention is to provide a mechanically operated signal which will make it unnecessary for the driver of the car to signal with an outstretched arm or hand, thus enabling both hands to be employed in steering and driving the vehicle and consequently decreasing the risks of accidents.

A further and additional object is to provide a signal in the form of an attachment which can be readily applied to either the right or left hand side of the vehicle and which may be used for both day and night driving, the said signal being conveniently operated from the steering wheel of the car.

Various other objects and advantages of the invention may become apparent from the following description, taken in connection with the accompanying drawings wherein:—

Figure 1 is a view in perspective, showing the signal in place on an automobile, Figure 2, a top plan of the signal device, showing the manner of attaching the same in place, Figure 3, a sectional view through the supporting arm of the attachment, disclosing the flexible shaft arrangement.

Figure 4 is a fragmentary side elevation.

Figure 5 is an edge elevation partly in section.

Figure 6 is a top plan view of the signal operating lever.

Figure 7 is a side view thereof.

Figure 8 is a detail view of the steering wheel clamp partly in section.

Figure 9 is a modified form of the signal arm bracket.

Figure 10 is a diagrammatic view showing movement of the signal operating arm with respect to its actuated means.

This attachment comprises a tubular supporting arm 1 having one end bent to extend laterally thereof in a horizontal plane, as shown at 2. The opposite end 3 of the arm is threaded and screws in the threaded opening of a right angular extension 4 which is an integral part of clamp element 5. Clamp element 5 has associated therewith the clamp element 6 and provides therewith a clamping bracket engageable about the windshield bracket 7, as illustrated in Figure 1. This bracket supports arm 1 and is secured to the standard by suitable fastening means, such as bolt 8 and nut 9. A lock nut 10 engages the threaded end of the supporting arm and is adjustable to tighten or loosen the arm with respect to the bracket.

A second bracket is provided for attachment to the shaft 11 of the steering wheel, which bracket comprises clamps 12 and 13, held together by bolt 14 and nut 15 and presenting concaved jaws 16 and 17 which serve as a bearing for one end of a flexible shaft 18. Shaft 18 extends through the tubular arm 1 and is provided at each end with a coupling member suitably united therewith as shown at 19. Coupling 20 is engaged between bearing jaws 16 and 17 of the steering-shaft bracket and has a squared extension 21 over which engages the square bored socket 22 of the signal operating lever, the outer terminal of the extension being threaded to receive lock nut 23. Coupling 24 at the opposite end of the flexible shaft is accommodated within the bent end tube of the arm and is provided with a channel or groove 25 in which engages the inner end of a lock pin or bolt 26 which is threadedly engaged in an opening in the arm. This pin prevents the shaft from moving longitudinally within the arm without interfering with the turning of the shaft within the arm. Coupling 25 is likewise provided with a squared extension 27 which projects forwardly of the bent end of the arm and engages in a square opening 28 in the signal or semaphore. A lock nut 29 is threadedly engaged with the outer end of the extension for removably retaining the signal in engagement with the shaft. Consequently, it will be seen that the rotation of the flexible shaft will cause the signal to move in the arc of a circle, the extent of movement being preferably three-quarters of a circle.

The signal is preferably formed of front and back glass panels of circular shape, the front panel being preferably colored a light green and the back panel being colored red.

These panels are supported by a hood 30 which also serves as a protector or guard for an electric bulb 31. Bulb 31 is used to illuminate the panels, indicated at 32 and 33, for night driving and is suitably engaged in a socket 34, the same being threaded, as at 35, for engaging with the lower threaded portion 36 of the hood. Socket 34 is supported in a bracket 37 of the signal and is electrically connected by wire conductors 38 to the dash switch 39 of the ignition system of the automobile so that the signal will be illuminated by turning on the lights of the car. The bracket 37 is secured adjacent the free end of a substantially V-shaped semaphore 37', having a recessed upper end. This recess is arranged midway the side edges of the semaphore and is shaped to conform to the curvature of the hood 30 as clearly shown in Figure 4 of the drawings. Therefore, the hood is not only supported by the bracket 37 but also rests in the recess as well. Moreover, a mirror 40 may be suitably connected to arm 1 as an aid to the driver of the vehicle in guiding the machine through traffic, etc.

The signal operating lever is preferably constructed of two parts, part 41 being integral with socket 22 and being slotted longitudinally, as at 42. Part 43 has a slide bearing on part 41 and is similarly slotted to accommodate bolt 44 which passes through the slots in both parts, being engaged at its opposite end by a thumbnut 45. This arrangement enables part 43 to be adjusted longitudinally of part 41 to accommodate the lever to various sizes of steering wheels, the bolt and thumbnut providing means for locking the parts in adjusted relation.

When the device is applied to cars of the coupé or sedan type, a modified form of bracket is substituted for clamps 12 and 13. This bracket is preferably in the form of an angle plate 46 to snugly fit the corner of the car and having a centrally disposed opening 47 in one wing thereof for threadedly engaging the threaded end 3 of the supporting arm, suitable means being provided for fastening the bracket in place.

In the use of the device, the steering wheel may be provided in any suitable manner with indicia indicating "Left," "Right," "Slow down" and "Straight ahead." The operating lever, it will be observed is positioned below the steering wheel and is actuated in practically the same manner as the spark lever and other levers of the steering wheel. The position of the signal is normally upright, indicating "Straight ahead." To give warning of a turn to the left, the operating lever is moved to the left, turning shaft 18 and causing the signal to assume a horizontal position on the left hand side of the arm, as shown in Figure 5. Movement of the lever to the right will cause a corresponding movement of the signal, the horizontal position of the latter on the right hand side of bent portion 2 indicating a turn to the "right." Continued movement of the lever will cause the signal to swing the supporting arm, assuming a vertical position and indicating the driver's intention of slowing down.

From the foregoing, it will be obvious that the invention provides an efficient and simply constructed signal attachment capable of ready application to an automobile and easily removable therefrom, without disfiguring or causing other injury to the car. Moreover, the arrangement is such as to permit the curtains of the car to be drawn whenever required without interference from the signal device, the same being conveniently operated from the steering wheel whether the curtains are drawn or rolled up.

It is also to be understood that the invention is susceptible to various changes and modifications in the construction, arrangement and combination of the several parts and the right is herein reserved to make all such changes as fall properly within the stroke of the appended claims.

What is thus claimed is:—

1. An automobile signal comprising a supporting arm having means of attachment to the automobile and bent angularly at one end to extend in horizontal plane, a flexible shaft supported by said arm for rotation relative thereto, a signal disposed adjacent the bent end of the arm and attached to the said flexible shaft for movement therewith, said signal being disposed for movement in a vertical plane and through the arc of a circle, a bracket having attachment to the steering-wheel shaft and presenting a bearing for the opposite end of the flexible shaft, and an operating lever at said end of the shaft for turning the same to move the said signal.

2. An automobile signal of the character described comprising an angle arm fixed to the wind shield of the automobile, a substantially V-shaped semaphore pivotally mounted on the free end of the angle arm for movement in a vertical plane through the arc of a circle and being provided with a substantially semi-circular recess disposed in its free end midway the side edges thereof, a bracket secured to the semaphore adjacent the recess and illuminated hood supported by the bracket and semi-circular recesses respectively and means for moving the semaphore as above set forth.

In testimony whereof I affix my signature.

CHARLIE H. MILLER.